Sept. 30, 1958 G. F. QUAYLE 2,853,889
GEAR SHIFT FOR INDUSTRIAL TRUCK
Filed Aug. 3, 1954 6 Sheets-Sheet 1

Fig.1.

ACTUATOR IS DOWN,
PREPARED TO SHIFT
TO LOW SPEED ONLY

← HIGH SPEED

LOW SPEED →

INVENTOR.
George F. Quayle
BY
P. H. Golden
ATTORNEY

Sept. 30, 1958 G. F. QUAYLE 2,853,889
GEAR SHIFT FOR INDUSTRIAL TRUCK
Filed Aug. 3, 1954 6 Sheets-Sheet 2

Fig. 2.

ACTUATOR IS UP,
PREPARED TO SHIFT
TO HIGH SPEED ONLY

INVENTOR.
George F. Quayle
BY
H. H. Golden
ATTORNEY

Sept. 30, 1958 G. F. QUAYLE 2,853,889
GEAR SHIFT FOR INDUSTRIAL TRUCK
Filed Aug. 3, 1954 6 Sheets-Sheet 4

INVENTOR
George F. Quayle
BY
ATTORNEY

Sept. 30, 1958  G. F. QUAYLE  2,853,889
GEAR SHIFT FOR INDUSTRIAL TRUCK
Filed Aug. 3, 1954  6 Sheets-Sheet 5

INVENTOR.
George F. Quayle
BY
ATTORNEY

Sept. 30, 1958 G. F. QUAYLE 2,853,889
GEAR SHIFT FOR INDUSTRIAL TRUCK
Filed Aug. 3, 1954 6 Sheets-Sheet 6

INVENTOR.
George F. Quayle
BY
A. H. Golden
ATTORNEY

United States Patent Office 2,853,889
Patented Sept. 30, 1958

2,853,889
GEAR SHIFT FOR INDUSTRIAL TRUCK

George F. Quayle, Philadelphia, Pa., assignor to The Yale & Towne Manufacturing Company, Stamford, Conn., a corporation of Connecticut Application August 3, 1954, Serial No. 447,628

18 Claims. (Cl. 74—477)

This invention relates to a gear shift for the transmission of an industrial truck. More particularly, my invention relates to novel means whereby I obtain shifting movements of the transmission elements through particular manipulation of a gear shift handle. Those skilled in the art will understand that industrial trucks are driven both forwardly and rearwardly over considerable distances and that these trucks, therefore, are equipped to move in both directions in both high and low speeds. It is the purpose of this invention to provide a gear shift that enables the operator to utilize a simple and direct movement of a shift handle to shift the truck transmission very easily between forward and rearward drive positions in each speed. Thus, whether in high or low speed, the handle moves in corresponding directions to the forward and rearward drive positions. In other words, the same movement of the shift handle reverses the truck in either speed position of the gears, and a further particular movement of the handle is preferably utilized to shift between high and low speed positions. Through my particular contribution, it is posible to accomplish this while utilizing a transmission having a rather usual arrangement of gears, and a pair of fork shifter elements that impart conventional shifting movements to the gears.

As one feature of my invention, I utilize means whereby both of the gear shifter elements are blocked against movement in one direction away from a neutral position when the gear shift handle is in a particular speed position. These means act when the handle is in another speed position to block the shifter elements against movement in an opposed direction. I am enabled by this arrangement to utilize a transmission having high and low speed gears on a forward drive shaft, and further high and low speed gears on a rearward drive shaft, with one of the shifter elements moving the gears on each drive shaft. The blocking means then permits the shifter elements to move the gears only to low speed positions for forward and rearward drive, or alternatively between high speed positions for the opposed directions of drive.

More particularly, I utilize for controlling the shifter elements a fulcruming plate that is arranged to effect relative movement between the shifter elements. I further utilize a control cam unit that in one position blocks movement of both shifter elements to high speed positions and that in an opposed position blocks movement of the shifter elements to low speed positions. Thereby, the fulcruming plate can move either the forward or reverse shifter element, with the reaction of the plate accepted by the other shifter element, and with both elements movable only to corresponding speed positions.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings.

Figure 1:
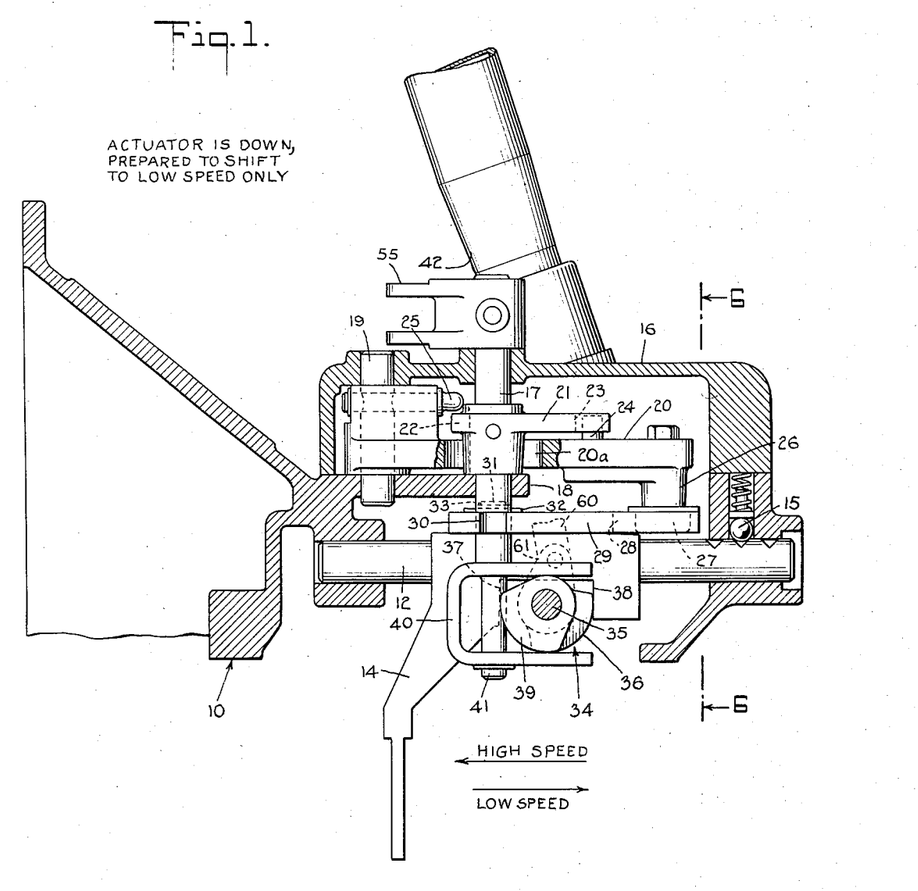
Fig. 1 is a longitudinal section showing my novel gear shift in neutral, but in position to move the gear shifter elements to low speed positions.
Figure 2:
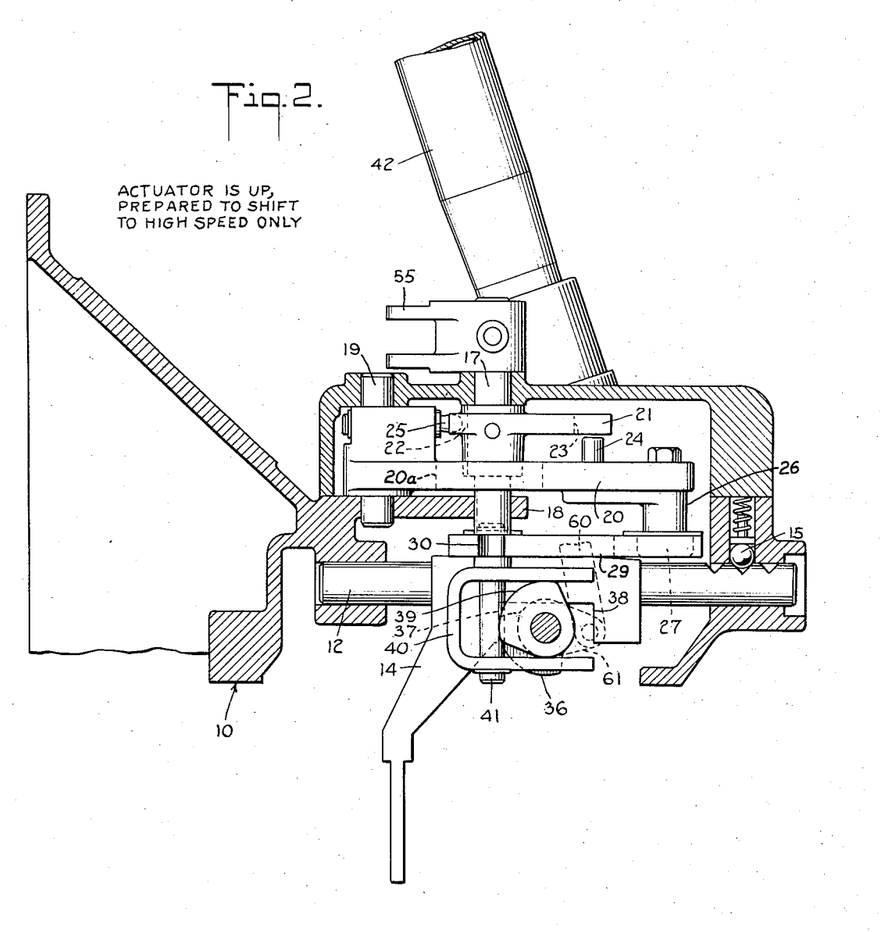
Fig. 2 is similar to Fig. 1, but with the gear shift in position to move the shifter elements to high speed positions.
Figure 6:
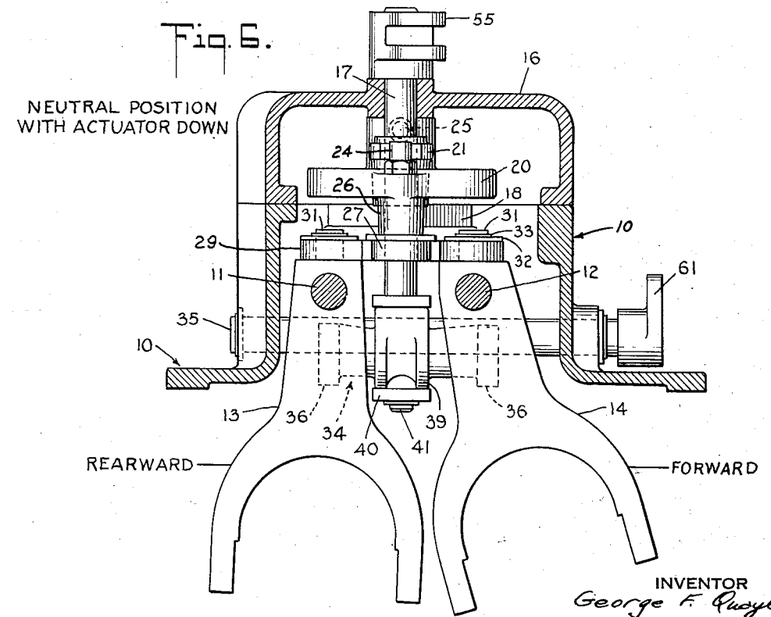
Fig. 6 is a cross-section on the lines 6—6 in Fig. 1.

Referring now more particularly to Figs. 1, 2, and 6 of the drawings, I indicate by the numeral 10 a transmission case. This transmission case carries a pair of sliding shifter rods 11, 12 upon which are respectively fixed gear shifter elements 13, 14. One end of each rod 11, 12 is notched at three points to enable a spring pressed ball 15 to coact with each rod for holding the rod in a neutral position, or in positions shifted in either direction from neutral position. The shifter elements 13 and 14 are bifurcated at their lower ends in a usual way to coact with transmission gears. The shifter element 13 moves away from neutral position in opposed directions to high and low speed rearward drive positions, and I shall hereinafter refer to this element 13 as the rearward shifter element. The shifter element 14 moves similarly to high and low speed forward drive positions, and I shall term this the forward shifter element. The high speed positions of both shifter elements 13, 14 are toward the left in Figs. 1 and 2. The actual gears shifted by the elements 13, 14 are not shown as they are per se not part of this invention.

In my novel gear shift construction, I utilize a cover 16 mounted over an opening in the upper part of the transmission case 10, as well shown in Figs. 1, 2, and 6. I mount a vertical actuator shaft 17 for sliding and rotating movement in openings formed in the cover 16 and in an arm 18 on the transmission case 10. This actuator shaft 17 is operated by a shift handle through means that will be described in due course, whereby to move the gear shifter elements 13, 14. I mount a further vertical shaft 19 in openings in the cover 16 and arm 18, and upon this shaft I secure a driver 20 to rotate horizontally just above the mounting arm 18. A large opening 20a in driver 20 provides clearance for the driver relatively to actuator shaft 17 and to the hub of an actuator 21 on this shaft.

Figure 3:
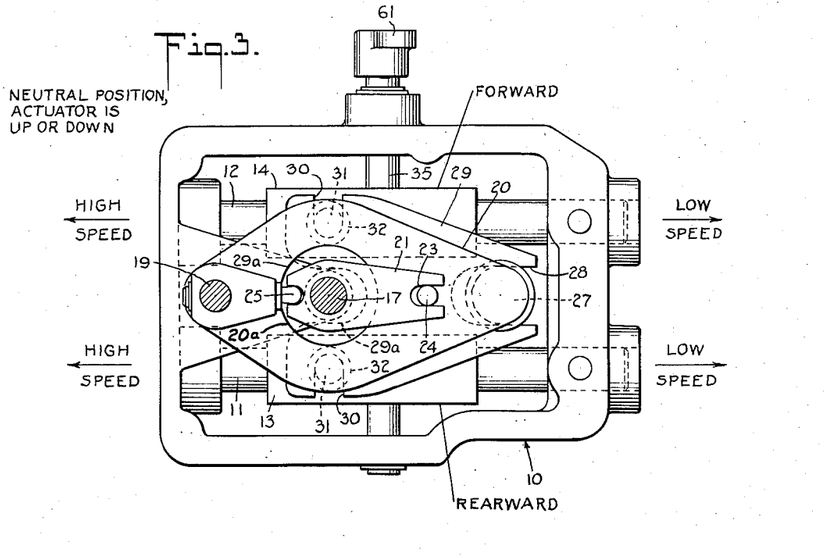
Fig. 3 is a plan view of the transmission with the cover removed, showing the gear shift in neutral position.
Figure 4:
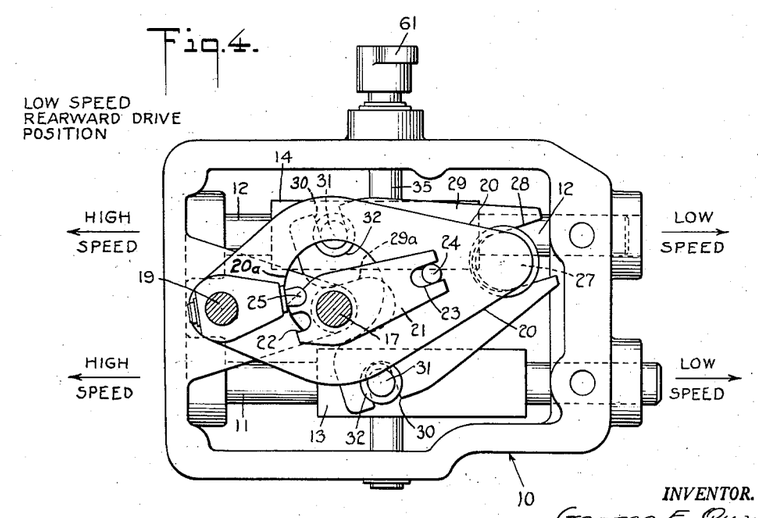
Fig. 4 is similar to Fig. 3, with the parts in position for rearward low speed drive.
Figure 5:
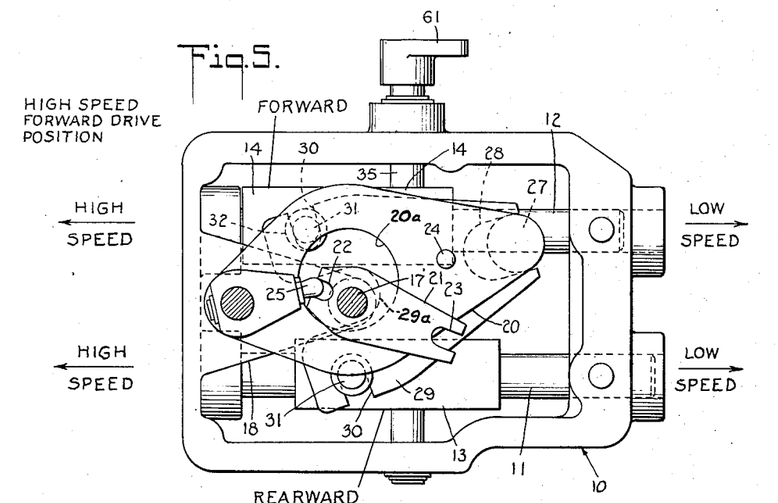
Fig. 5 is similar to Fig. 3, but with the parts in position for forward high speed drive.

As best seen in Figs. 3, 4, and 5, actuator 21 is secured to shaft 17 and rotates therewith. A slot 23 formed in actuator 21 is adapted to coact with a vertical pin 24 on the driver 20, while a slot 22 in actuator 21 is adapted to coact with a tooth 25 on the driver 20. The pin 24 and tooth 25 are mounted at different levels on driver 20 so that the actuator 21 cannot coact simultaneously with both the tooth 25 and the pin 24. However, by a vertical movement of the actuator shaft 17 the actuator 21 can be engaged through its slots 22, 23 with either the pin or the tooth. It is extremely important, for reasons that will appear, to observe that the actuator 21 coacts with tooth 25 and pin 24 at opposed sides of the axis of shaft 17, whereby actuator 21 when rotating in a particular direction swings the driver member 20 therewith in the same direction or in the opposed direction, all depending upon the vertical position of the actuator 21 and whether its slots are engaged with the tooth 25 or the pin 24.

At the end of driver 20 I form a downwardly extending portion 26 upon which a roller 27 is mounted in a vertical axis. This roller 27 coacts with a slot 28 formed longitudinally in one end of a more or less triangular fulcruming plate 29 well shown in Figs. 3 to 5. Plate 29 rests upon the upper surfaces of shifter elements 13, 14, as seen in Figs. 1, 2, and 6. Each shifter element 13, 14 is equipped at its upper side with a vertical pin 31, and these pins 31 are engaged in slots 30 in opposed edges of fulcruming plate 29. Washers 32 and snap rings 33 on the pins 31 retain the fulcruming plate 29 relatively to the pins 31 and the shifter elements 13, 14. A slot 29a in the fulcruming plate 29 provides clearance that enables this plate to move relatively to shaft 17.

It will be appreciated that this arrangement enables the driver 20 to move the shifter elements 13, 14 relatively to one another through a swinging movement of the fulcruming plate 29. Thus, if we assume that the driver 20 rotates counterclockwise from the neutral position shown in Fig. 3 to the shifted position shown in Fig. 4, the driver 20 acts through roller 27 and slot 28 to swing the fulcruming plate 29 counterclockwise therewith. The plate 29 then reacts between the two pins 31 to press the rearward and forward shifter elements 13, 14 away from the neutral position of Fig. 3, under the control of means to be described below. Through these means, one of the shifter elements 13, 14 accepts the reaction of the plate 29 to form a pivot or fulcrum for the plate, so that the plate moves only the opposed element 13 or 14. Thereby, when actuator 21 is in its lower position, the driver 20 when rotating counterclockwise from the position of Fig. 3 can shift the rearward shifter element 13 to the right as in Fig. 4, with the reaction of plate 29 accepted by element 14. If the actuator 12 is in its upper position, the driver 20 moves plate 29 to shift forward shifter element 14 to the left with the reaction now accepted by shifter 13, as in Fig. 5.

For determining which shifter element 13, 14 accepts the reaction of the fulcruming plate 29, thereby determining the particular movements of these elements, I utilize a control cam unit 34, Figs. 1, 2, and 6. This cam unit 34 is fixed upon a shaft 35 that is mounted to rotate on the upper part of the transmission case 10 in a transverse position just below the shift rods 11, 12. Opposed ends of the control cam unit 34 have cams 36 that are positioned for coaction with either of spaced vertical surfaces 37, 38 formed integrally on each shifter element 13, 14, as best seen in Figs. 1 and 2. The vertical surfaces 37, 38 are so spaced relatively to one another that each shifter element can move with its rod 11, 12 relatively to the cams 36, but with the cams coacting either with surfaces 37 or with surfaces 38, depending upon the rotated position of the cams, to block the movement of the shifter elements in one direction or the other away from neutral position. By blocking the movement of the shifter elements 13, 14 in this way, I am able to control the action of the fulcruming plate 29.

More particularly, when the control cams 36 block the movement of the shifter elements 13, 14, toward the left as in Fig. 1, through coaction with surfaces 38, the shifter elements can move only toward the right, or toward their low speed positions. With the parts in the position of Fig. 1, if fulcruming plate 29 is moved by roller 27 from a central neutral position shown in Fig. 3 in a counterclockwise direction to the position shown in Fig. 4, the forward shifter element 14 can obviously not move in the direction to which it is pressed by plate 29 and therefore said forward shifter element 14 must accept the reaction of the plate 29, so that the rearward shifter element 13 moves toward the right to low speed position. If, on the other hand, roller 27 moves the fulcruming plate 29 clockwise, the rearward shifter element 13 accepts the reaction of the plate and the forward element 14 moves toward the right to low speed position.

If we now consider what happens when the control cams 36 block the movement of the shifter elements 13, 14 from neutral position toward the right through coaction with surfaces 37, as in Fig. 2, we see that the shifter elements can move only toward the left, to high speed position. With the parts in the position of Figs. 2 and 3, if roller 27 moves the fulcruming plate 29 counterclockwise to the position shown in Fig. 5, the rearward shifter element 13 accepts the reaction of the plate because this element cannot move to the right, and plate 29 therefore moves the forward shifter element 14 to the left to high speed position. Similarly, with cams 36 blocking movement of both shifter elements 13, 14, toward the right, a clockwise movement of fulcruming plate 29 will effect movement of the rearward shifter element 13 to the left, with the reaction of the plate accepted by element 14.

In the arrangement that I have thus far described, the fulcruming plate moves back and forth in a particular path to position the shifter elements 13, 14. It is reciprocated in this particular path through rotation of the driver 20 about pivot shaft 19. Driver 20 is in turn rotated through rotation of actuator 21 integrally with shaft 17. When shaft 17 and actuator 21 are rotated together counterclockwise as from the position of Fig. 3 to the position of Fig. 4, the driver 20 will also be rotated counterclockwise if the actuator 21 is in its lower position of Fig. 1 corresponding to low speed. On the other hand, if the actuator 21 is in its raised or high speed position shown in Fig. 2, counterclockwise rotation thereof will effect clockwise rotation of the driver 20. The rotation of shaft 17 will move the reverse gear and forward gear between neutral and high speed positions, or between neutral and low speed positions, depending upon whether or not the actuator is in a raised or lowered position, if at the same time the direction of shifting of the gears is controlled by the cam unit 34 through cams 36. I shall now describe the means for moving the actuator 21 and its shaft 17 between lowered and raised positions to obtain this control. I shall also describe how the shaft 17 is rotated to change the direction of the gears in high speed and in low speed through the same rotation of the shaft 17 and actuator 21.

I have already referred to the vertical movement of actuator shaft 17 whereby actuator 21 is engaged with the driver 20 either through pin 24 or tooth 25, this vertical movement enabling the actuator 21 to rotate driver 20 either in the same direction as the actuator, or in an opposed direction. For moving actuator 21 vertically, I equip the control cam unit 34 with a cam 39, Figs. 1, 2, and 6, engaged between horizontal arms of a U-shaped bracket 40 that is mounted on a downwardly extending part 41 of the actuator shaft 17. Thereby the cam shaft 35 acts when rotating to engage the actuator 21 with the tooth 25, as in Figs. 2 and 5, while simultaneously blocking movement of the shifter elements 13, 14 to low speed positions; or alternately to engage the actuator 21 with pin 24 on driver member 20, while blocking the movement of the shifter elements to high speed positions. By rotating the cam shaft 35, therefore, I can reverse the action of the actuator 21 relatively to the shifter elements 13, 14 while blocking the movements of these elements in one direction or another. It is through this action that I enable the actuator 21, and therefore, the shift handle, to rotate always in the same direction for a particular direction of travel, whether to high or low gear position.

Figure 7:
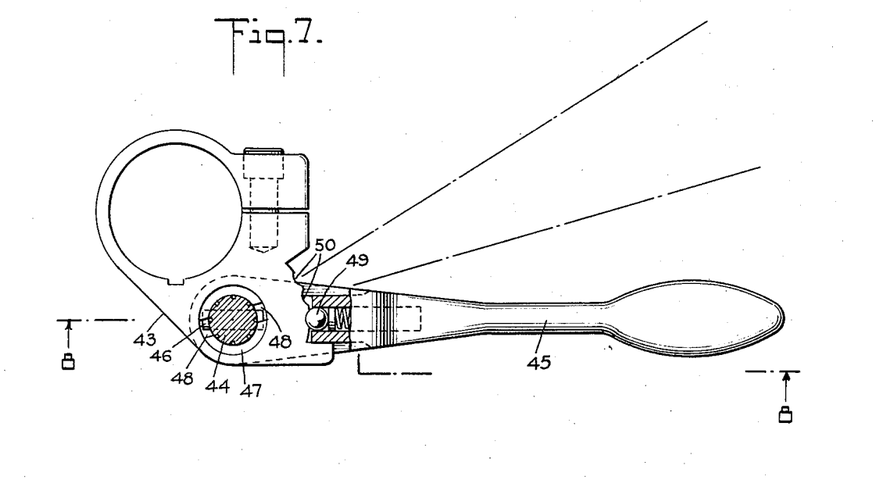
Fig. 7 shows the mounting of the gear shift handle.
Figure 8:
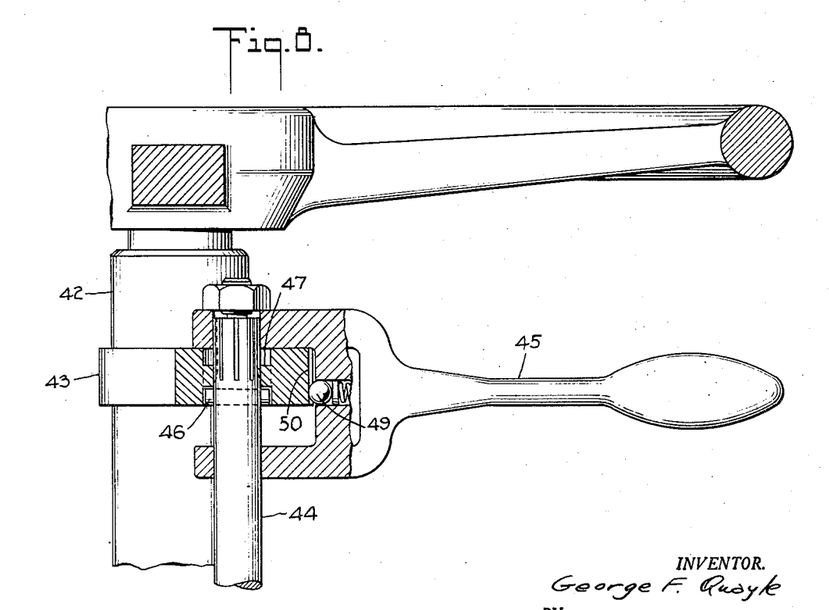
Fig. 8 is a view on the line 8—8 of Fig. 7.

I shall now describe the shift handle and the particular means whereby this handle rotates the actuator shaft 17 and the cam shaft 35. Referring particularly to Figs. 7 and 8, I designate the steering column of the truck by numeral 42. On the upper part of this steering column I secure a bracket 43 having a bearing in which a shifter rod 44 rotates and also slides longitudinally. Splined to the rod 44 is a shift handle 45 that is adapted to rotate rod 44 and also to move this rod vertically. The rod 44 has a cross pin 46 that can be engaged either above or below a pair of shoulders 47 on the bearing in the bracket 43, and that will allow the rod 44 to rotate, but that will allow the rod 44 to move vertically only when pin 46 is rotated to a particular position aligned with vertical slots 48 in the shoulders 47. The position of the cross pin 46 above the shoulders 47 corresponds to the high speed range of the handle 45, with the handle adapted to rotate between forward and rearward drive positions in this range. The pin 46 allows the handle 45 to rotate similarly in the low speed range, but the handle can be moved between high and low speed only when in a neutral position corresponding to the aligned relation of cross pin 46 with the slot 48. This corresponds to the position of the parts in Fig. 3.

I mount on the shift handle 45 a spring pressed ball 49 adapted to coact with three grooves 50 in the bracket 43 for holding the handle 45 in forward, reverse and neutral positions. These grooves 50 extend longitudinally to hold the ball 49 whether the shift handle 45 is in high speed or low speed positions.

Figures 9, 10:
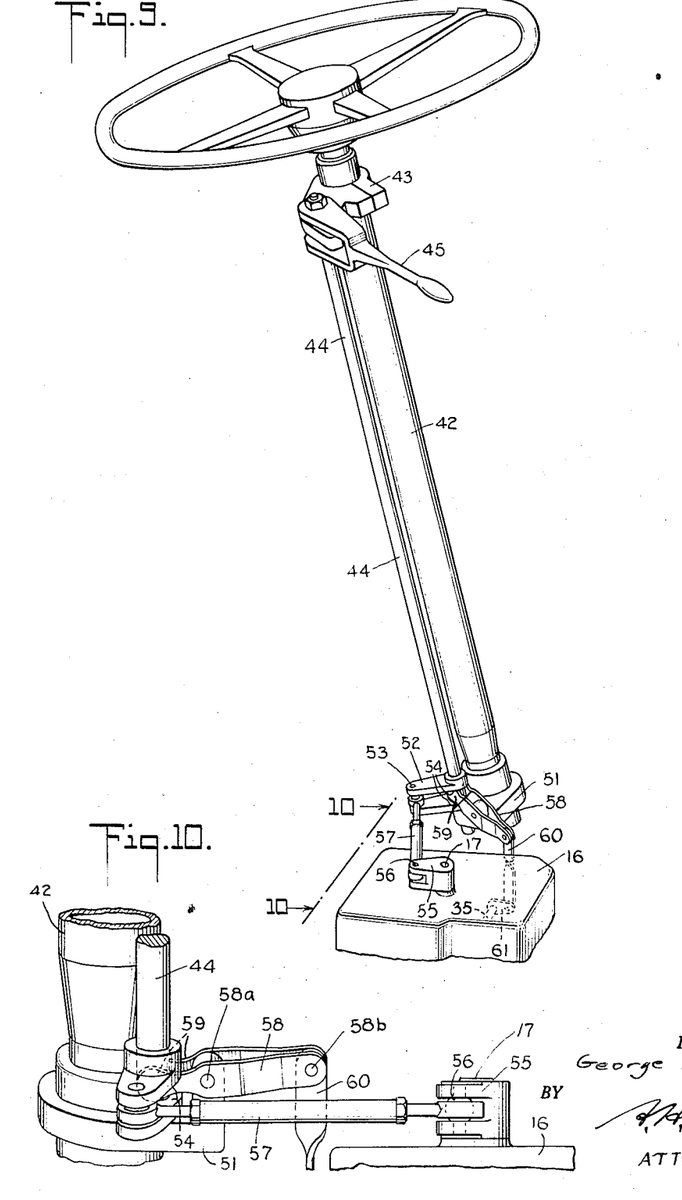
Fig. 9 is a view illustrating the linkage through which the handle actuates the gear shift.
Fig. 10 is a view on the line 10—10 of Fig. 9.

Upon the lower end of the steering column 42 I mount a bracket 51, best seen in Figs. 9 and 10, that supports the lower end of the shift rod 44 for sliding and rotary movement. Fixed upon the shift rod 44 for movement integrally therewith is a bifurcated bracket 52 having upper and lower portions 54 that extend laterally from the shift rod 44 for a purpose to be indicated presently.

On that part of the actuator shaft 17 extending above the transmission cover 16 is fixed a bifurcated bracket 55 supporting therebetween a pivot 56 equipped with a central ball portion. The bifurcated arm 52 similarly houses a pivot shaft 53 equipped with a central ball portion. An adjustable tie rod 57 extends between the two ball portions of pivots 53 and 56, it being obvious that through the pivots 53, 56 and the tie rod 57, shift rod 44 may impart rotary movement to the shaft 17.

Lying between the upper and lower parts 54 of the bifurcated arm 52 are spaced fingers 59 on one end of a bifurcated lever 58. This lever 58 has at an intermediate point in its length a transverse pivot 58a through which it is pivoted to the bracket 51 on steering column 42. The opposed end of lever 58 is pivoted at 58b to a link 60, link 60 being in turn pivoted to an arm 61 that is secured to the cam shaft 35. Through this arrangement, vertical movement of the shift rod 44 relatively to its bearings in brackets 51 and 43 effects rotation of the cam shaft 35. It is further obvious that through the arrangement just described, rotation of the shift rod 44 by handle 45 will effect corresponding rotation of the actuator shaft 17.

It will be well to review now the operation of my novel gear shift. Referring to Figs. 7, 8, and 9, the shift handle 45 rotates the shift rod 44, this rod then acting through link 57 to rotate shaft 17 and its actuator 21 in directions corresponding to the rotation of shift handle 45. When moved vertically, in neutral, handle 45 moves shift rod 44 endwise and thereby acts through lever 58 and link 60 to rotate cam shaft 35. With shift handle 45 in neutral position, actuator 21 is positioned as in Fig. 3.

Let us now suppose that shift handle 45 is moved vertically downwardly to low speed position. The downward movement of handle 45 moves shift rod 44 endwise to actuate lever 58 and link 60, thereby rotating cam shaft 35, with cam 39 thereby moving actuator 21 downwardly to the position shown in Fig. 1. Simultaneously with this action, cams 36 rotate so that they are juxtaposed to surfaces 38 whereby to block movement of the rearward and forward shifter elements 13, 14 to the left toward high speed positions. Actuator 21 is now engaged with pin 24 so that the driver 20 and fulcruming plate 29 rotate in the same direction as actuator 21. Because both shifter elements 13, 14 are blocked against movement to the left, rotation of handle 45 and shift rod 44 can effect movement of shift elements 13, 14 only between neutral and low speed position. Thus, movement back and forth of handle 45 will merely effect the drive of the truck in low speed forward and reverse.

If the operator now wishes to drive in high speed he first moves the shift handle upwardly in neutral position. This moves the actuator and cams to the position shown in Fig. 2. The cams 36 are juxtaposed to the surfaces 37 on shifter elements 13, 14 to block movement of these elements from neutral position toward the right. Also, cam 39 holds the actuator 21 in its upward position engaged with the tooth 25 on driver 20, so that the actuator will rotate driver 20 in a direction opposed to the rotation of actuator 21. Because both shifter elements 13, 14 are blocked toward movement to the right, rotation of the handle 45 and shift rod 44 can effect movement of shifter elements 13, 14 only between neutral and high speed positions. Thus, movement back and forth of the handle 45 will effect forward and rearward drive, but in high speed. Moreover, because the actuator now moves driver 20 in a direction opposed to the movement of the actuator, the direction in which handle 45 rotates for driving the truck in a particular direction will be the same for high speed as for low speed.

Through the extremely novel gear shift that I have described, I am able, while utilizing a standard transmission, to shift the transmission for opposed directions of travel in the same speed through a direct linear movement of a shift handle. I can do this in either high speed or low speed positions of the transmission. Moreover, I can utilize a shift handle that rotates in the same direction for driving the truck in a particular direction, whether in high or low speed. I believe, therefore, that the very considerable advantages of my invention will be fully appreciated by those skilled in the art.

I now claim:

1. In a combination of the class described, a pair of shifter elements each moving from a neutral position in opposed directions to two gear positions, means acting relatively to each shifter element simultaneously to block movement of both shifter elements in one direction from said neutral position or alternately in the opposed direction from said neutral position, and a common means for moving either of said shifter elements in the direction it is free to move.

2. In a combination of the class described, a pair of shifter elements, means mounting said shifter elements for sliding between a neutral position and opposed gear positions, means acting relatively to each shifter element simultaneously to block the movement of both said shifter elements from their said neutral positions to one or alternately to the other of said opposed gear positions, a rotating shift actuator, a fulcruming plate in fulcrum relation to each of said shifter elements, means whereby rotation of said actuator in either of opposed directions fulcrums said plate relatively to one or the other of said shifter elements for shifting one or the other of said shifter elements through its fulcrum to a gear position, and said plate when shifting either shifter element in the direction in which it is free to move applying the shifting reaction to the opposed shifter element locked against movement in the direction of said shifting reaction.

3. In a combination of the class described, a pair of shifter elements, means mounting said shifter elements for axial sliding in parallel relation between a central neutral position and opposed gear positions, means acting relatively to each shifter element simultaneously to block the movement of both said shifter elements from their said neutral positions to one or alternately to the other of said opposed gear positions, a rotating shift actuator, a fulcruming plate in fulcrum relation to said shifter elements, a first means whereby rotation of said actuator in either of opposed directions fulcrums said plate relatively to one or the other of said shifter elements for shifting one or the other of said shifter elements to a gear position, said plate when shifting either shifter element in the direction in which it is free to move applying the shifting reaction to the opposed shifter element locked against movement in the direction of said shifting reaction, and a second means whereby said actuator when rotating fulcrums said plate to reverse the said shifting directions.

4. In a combination of the class described, a pair of shifter elements, means mounting said shifter elements for axial sliding in parallel relation between a central neutral position and opposed gear positions axially spaced from said central neutral position, means for blocking the movement of both said shifter elements from their said neutral positions in one direction to one of said opposed gear positions and alternately for blocking the movement of said shifter elements from neutral position in the opposed direction, a rotating shift actuator movable into two vertically spaced positions, a fulcruming plate in fulcrum relation to both said shifter elements, means whereby rotation of said actuator in either of opposed directions in one vertical position fulcrums said plate relatively to one or the other of said shifter elements for shifting one or the other of said shifter elements to a gear position, said plate when shifting either shifter element in the direction in which it is free to move applying the shifting reaction the opposed shifter element blocked against movement in the direction of said shifting reaction, and a second means whereby said actuator when rotated in the other of its vertical positions fulcrums said plate to reverse the said shifting directions.

5. In a combination of the class described, a pair of shifter elements, means mounting said shifter elements for axial sliding in parallel relation between a central neutral position and opposed gear positions axially spaced from said central neutral position, means for blocking the movement of both said shifter elements from their said neutral positions in one direction to one of said opposed gear positions and alternately for blocking the movement of said shifter elements from neutral position in the opposed direction, a rotating shift actuator movable into two vertically spaced positions, a fulcruming plate in fulcrum relation to both said shifter elements, means whereby rotation of said actuator in either of opposed directions in one vertical position fulcrums said plate relatively to one or the other of said shifter elements for shifting one or the other of said shifter elements to a gear position, said plate when shifting either shifter element in the direction in which it is free to move applying the shifting reaction to the opposed shifter element blocked against movement in the direction of said shifting reaction, a gear shift lever mounted for vertical movement and for rotary movement, and means whereby the said movements of said lever actuate said blocking means and effect vertical and rotary movement of said actuator.

6. In a combination of the class described, a pair of shifter elements, means mounting said shifter elements for sliding between a neutral position and gear positions, means acting relatively to each shifter element simultaneously to block the movement of both said shifter elements in one direction from their said neutral positions while leaving said shifter elements free for movement in the opposed direction, a rotating shift actuator, a fulcruming plate in pin and slot fulcrum relation to each of said shifter elements, means whereby rotation of said actuator in either of opposed directions fulcrums said plate relatively to one or the other of said shifter elements on said pin and slot fulcrum for shifting one or the other of said shifter elements to a gear position through said pin and slot fulcrum, and said plate when shifting either shifter element in the direction in which it is free to move applying the shifting reaction to the opposed shifter element locked against movement in the direction of said shifting reaction.

7. In a combination of the class described, a pair of shifter elements, means mounting each of said elements for movement from a neutral postion in opposed directions to two gear positions, means acting relatively to each shifter element simultaneously to block the movement of both shifter elements in one or the other direction from said neutral position while leaving said shifter elements free for movement in the opposed direction from said neutral position, a rotating shift lever, and a common means rotatable with said shift lever in opposed directions for moving one or the other of said shifter elements in the direction it is free to move depending on the direction of rotation of said common means.

8. In a combination of the class described, a pair of shifter elements each moving from a neutral position in opposed directions from its neutral position to two gear positions, means acting relatively to each shifter element simultaneously to block the movement of both shifter elements, means for actuating the blocking means to hold the shifter elements against movement alternately in one direction or the other from neutral position while leaving said elements free for movement in the opposed direction from said neutral position, a swinging connector in fulcrum relation to both shifter elements, and means for moving said connector to throw either of said shifter elements in the direction it is free to move.

9. In a combination of the class described, a pair of shifter elements each moving from a neutral position in opposed directions from its neutral position to two gear positions, means acting relatively to each shifter element simultaneously to block the movement of both shifter elements alternately in one direction from their neutral position or alternately in the opposed direction from said neutral position, a swinging connector having a pin and slot connection with each of said shifter elements, and a common means for swinging said connector in opposed directions to throw either of said shifter elements in the direction it is free to move.

10. In a combination of the class described, a pair of shifter elements, means mounting said shifter elements for axial sliding between a central neutral position and opposed gear positions, means for blocking simultaneously the movement of both said shifter elements from their said neutral positions alternately to one or the other of said opposed gear positions, a rotating shift actuator movable into two vertically spaced positions, a fulcruming plate in fulcrum relation to said shifter elements at opposed points of said fulcruming plate, a pivoted driver having a pin for swinging said fulcruming plate, and means whereby rotation of said actuator in either of opposed directions in one vertical position rotates said driver on its pivot to fulcrum said plate relatively to one of said shifter elements while shifting the other of said shifter elements to a gear position, the moving shifter element moving in the direction in which it is free to move while the shifting reaction is accepted by the opposed shifter element blocked against movement in the direction of said shifting reaction, and a second means whereby said actuator when rotated in the other of its vertical positions rotates said driver on its pivot to fulcrum said plate to reverse the said shifting directions.

11. In a combination of the class described, a pair of shifter elements, means mounting said shifter elements for axial sliding in parallel relation between a central neutral position and opposed gear positions axially spaced from said central neutral position, means acting relatively to each shifter element simultaneously for blocking the movement of both said shifter elements from their said neutral positions in one or the other direction to one of said opposed gear positions and alternately for blocking the movement of said shifter elements from neutral position in the opposed direction, a rotating shift actuator, means whereby rotation of said actuator moves one or the other shifter element in the direction in which it is free to move while the opposed shifter element is blocked against movement, a gear shift lever mounted for vertical movement and for rotary movement, and means whereby the said movements of said lever actuate said blocking means and effect rotary movement of said actuator.

12. In a combination of the class described, a pair of shifter elements, means mounting each of said shifter elements for movement from a neutral position in opposed directions to high and low speed gear positions, a pair of cams, a surface on each cam for controlling the direction in which a shifter element moves from neutral, means for setting both cams to hold the shifter elements against movement between neutral and high speed positions or to hold said elements against movement between neutral and low speed positions and means for moving both shifter elements relatively to high or low speed positions depending upon the setting of said cams.

13. In a combination of the class described, a pair of shifter elements, a gear shift handle, means through which said gear shift handle moves each of said shifter elements from a neutral position in opposed directions to high and low speed gear positions, cam means for controlling the movement of said each shifter elements, the surface of said cam means for blocking the movement of said shifter elements from neutral, means whereby said shift handle rotates said cam means to position its surface to hold the shifter elements against movement between neutral and high speed positions, and said shift handle when rotating the cam means to a second position placing the cam surface to hold said shifter elements against movement between neutral in one direction or the other and low speed positions.

14. In a combination of the class described, a pair of shifter elements, means mounting each of said shifter elements for movement from a neutral position in opposed directions to high and low speed gear positions, cam means for controlling the direction in which the shifter elements move from neutral, a gear shift handle, means whereby said gear shift handle when moving vertically positions said cam means to hold the shifter elements against movement between neutral and high speed positions, said shift handle by an opposed vertical movement positioning the cam means to hold said elements against movement between neutral and low speed positions, and means through which the shift handle when rotating shifts the shifter elements in the direction in which they are free to move.

15. In a combination of the class described, a pair of shifter elements, means mounting each of said shifter elements for movement from a neutral position in opposed directions to high and low speed gear positions, a pair of cams, a surface on each cam for controlling the direction in which a shifter element moves from neutral, a gear shift handle, means whereby said gear shift handle when moving vertically positions both cams to hold the shifter elements against movement between neutral and high speed positions, said shift handle by an opposed vertical movement positioning the cams to hold said elements against movement between neutral and low speed positions, fulcruming means acting between the shifter elements for moving said elements individually, and means through which the shift handle when rotating actuates the fulcruming means whereby to shift a shifter element in the direction in which it is free to move.

16. In a combination of the class described, a gear shift handle, an actuator, means whereby the gear shift handle actuates said actuator in a particular axis and also moves the actuator longitudinally in said axis, a pair of shifter elements, a driver in driving relation to the shifter elements for shifting said elements relatively to a neutral position, means whereby the actuator when in one longitudinal position in its axis contacts the driver at one side of said axis, said actuator when so contacting the driver enabling the shift handle to move the driver through rotation of the actuator, means whereby the actuator when moved by the shift handle to a second longitudinal position contacts the driver at the opposed side of the actuator axis, and said actuator when in said second longitudinal position reversing relatively to the shift handle the direction in which the handle moves the driver.

17. In a combination of the class described, a pair of shifter elements each adapted to move from a neutral position in opposed directions to two gear positions, means acting to hold simultaneously both shifter elements against movement in one direction from said neutral position or alternatively to hold the elements against movement in the other direction from said neutral position, a shift actuator, means through which said shift actuator coacts with both shifter elements and means for moving said shift actuator to shift each element individually to a gear position in that direction in which the element is free to move.

18. In a combination of the class described, a gear shift handle, an actuator, means whereby the gear shift handle actuates said actuator, means whereby said gear shift handle moves the actuator to either of two positions for actuation in either position, a pair of shifter elements, a driver in driving relation to the shifter elements for shifting said elements relatively to a neutral position, means whereby the actuator when in the first of said positions coacts with the driver to enable the shift handle to move the driver through the actuator, and means whereby the actuator when moved by the shift handle to its second position coacts with the driver for reversing relatively to the shift handle the direction in which the handle moves the driver.

References Cited in the file of this patent

UNITED STATES PATENTS

| | | |
|---|---|---|
| 1,635,526 | Austin | July 12, 1927 |
| 1,819,889 | Getz | Aug. 18, 1931 |
| 2,265,378 | Lawler | Dec. 9, 1941 |
| 2,377,700 | Kurtz | June 5, 1945 |
| 2,498,889 | Iavelli | Feb. 28, 1950 |